(12) United States Patent
Shim et al.

(10) Patent No.: US 7,747,348 B2
(45) Date of Patent: Jun. 29, 2010

(54) METHOD AND APPARATUS FOR USING ROTATIONAL MOVEMENT AMOUNT OF MOBILE DEVICE AND COMPUTER-READABLE RECORDING MEDIUM FOR STORING COMPUTER PROGRAM

(75) Inventors: Young-bo Shim, Seoul (KR); Kyung-shik Roh, Gyeonggi-do (KR); Woo-sup Han, Gyeonggi-do (KR); Woong Kwon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1068 days.

(21) Appl. No.: 10/935,592

(22) Filed: Sep. 8, 2004

(65) Prior Publication Data

US 2005/0137750 A1    Jun. 23, 2005

(30) Foreign Application Priority Data

Dec. 23, 2003    (KR) ...................... 10-2003-0095522

(51) Int. Cl.
*G06F 19/00*    (2006.01)

(52) U.S. Cl. ...................... 700/245; 700/253; 700/254; 700/259; 700/900; 701/23; 701/25; 701/28; 701/200; 701/207; 701/208; 701/209; 340/995.24; 340/995.22; 324/200; 324/202; 318/568.1; 318/568.12; 318/568.15; 318/568.16; 382/104; 382/106; 382/209

(58) Field of Classification Search ................. 700/245, 700/253, 254, 259, 900; 701/25, 28, 207, 701/23, 200, 208, 209; 340/995.24, 995.22; 324/200, 202; 318/568.12, 568.1, 568.15, 318/568.16; 382/104, 106, 209
See application file for complete search history.

(56) References Cited

U.S. PATENT DOCUMENTS 6,683,969 B1 *    1/2004   Nishigaki et al. ........... 382/104

(Continued)

FOREIGN PATENT DOCUMENTS

JP              03-290800            12/1991

(Continued)

OTHER PUBLICATIONS

European Search Report (in English), issued by The Hague on Oct. 23, 2006, in European Patent Application No. EP 04 25 4937.8.

(Continued)

*Primary Examiner*—Khoi Tran
*Assistant Examiner*—Jorge O Peche
(74) *Attorney, Agent, or Firm*—Staas & Halsey LLP

(57) ABSTRACT

Provided is a method of using a rotational movement amount of a mobile device including obtaining images at two different points on a path along which the mobile device moves, searching for matching points with respect to the obtained images and obtaining an image coordinate value of each of the matching points, sensing linear movement of the mobile device and obtaining a linear movement amount using a result of sensing, and obtaining the rotational movement amount using the image coordinate values and the linear movement amount.

16 Claims, 5 Drawing Sheets

U.S. PATENT DOCUMENTS

| | | | |
|---|---|---|---|
| 6,690,011 B2 * | 2/2004 | Watanabe et al. | 250/330 |
| 6,956,503 B2 * | 10/2005 | Yokokohji et al. | 340/988 |
| 7,141,796 B2 * | 11/2006 | Hattori et al. | 250/370.08 |
| 2001/0002936 A1 * | 6/2001 | Tsuji et al. | 382/170 |
| 2002/0049530 A1 * | 4/2002 | Poropat | 701/207 |
| 2002/0126876 A1 * | 9/2002 | Paul et al. | 382/104 |
| 2003/0007074 A1 * | 1/2003 | Nagaoka et al. | 348/148 |
| 2003/0169918 A1 * | 9/2003 | Sogawa | 382/154 |
| 2004/0066965 A1 * | 4/2004 | Watanabe et al. | 382/154 |
| 2004/0068416 A1 * | 4/2004 | Solomon | 705/1 |
| 2004/0168148 A1 * | 8/2004 | Goncalves et al. | 717/104 |
| 2004/0183906 A1 * | 9/2004 | Nagaoka et al. | 348/148 |
| 2004/0239756 A1 * | 12/2004 | Aliaga et al. | 348/36 |
| 2005/0063565 A1 * | 3/2005 | Nagaoka et al. | 382/104 |
| 2005/0071047 A1 * | 3/2005 | Okabayashi et al. | 700/245 |
| 2005/0165507 A1 * | 7/2005 | Shimizu et al. | 700/245 |
| 2005/0240307 A1 * | 10/2005 | Kuroki et al. | 700/245 |
| 2007/0090973 A1 * | 4/2007 | Karlsson et al. | 340/995.22 |
| 2007/0195997 A1 * | 8/2007 | Paul et al. | 382/104 |
| 2008/0004632 A1 * | 1/2008 | Sutherland et al. | 606/130 |

FOREIGN PATENT DOCUMENTS

| | | |
|---|---|---|
| JP | 2003-178309 | 6/2003 |
| KR | 2003-54360 | 7/2003 |
| WO | 03/102706 A1 | 12/2003 |

OTHER PUBLICATIONS

Olson, Clark F., et al., *"Rover navigation using stereo ego-motion"*, Robotics and Autonomous Systems, Jun. 30, 2003, pp. 215-229, vol. 43, No. 4, Elsevier Science B.V., Amsterdam, NL.

J. Borenstein et al., "Where am I? Sensors and Methods for Mobile Robot Positioning", Oak Ridge National Laboratories D & D Program, Apr. 1996, pp. 10-11.

J. Borenstein et al., "Where am I? Sensors and Methods for Mobile Robot Positioning", Oak Ridge National Laboratories D & D Program, Apr. 1996, pp. 132-150.

J. Borenstein et al., "Measurement and Correction of Systematic Odometry Errors in Mobile Robots", IEEE Transactions on Robotics and Automation, vol. 12, No. 6, Dec. 1996, pp. 869-880.

Nakju Lett Doh et al., "Relative Localization Using Path Odometry Information", IEEE Transactions on Robotics and Automation, Sep. 2003, pp. 1606-1612.

H.R. Everette, "Sensors for Mobile Robots—Theory and Application", A K Peters, Ltd., 1995, pp. 35-65.

Milan Sonka et al., "Image, Processing, Analysis, and Machine Vision", Brooks/Cole Publishing Company, 1999.

John J. Craig, "Introduction to Robotics: Mechanics and Control", Addison-Wesley Publishing Company, Inc., 1989.

H.R. Everett, "Sensors for Mobile Robots-Theory and Application", A K Peters, Ltd., 1995.

Sonka et al., "Image Processing, Analysis and Machine Vision", PWS Publishing, 1999, pp. 462.

John J. Craig, "Introduction to Robots", Addison-Wesley Publishing Company, 1986, pp. 50.

Sonka et al., "Image Processing, Analysis and Machine Vision", PWS Publishing, 1999, pp. 448-465.

Sonka et al., "Image Processing, Analysis and Machine Vision", PWS Publishing, 1999, 466-476.

Z. Zhang et al., "A Robust Technique for Matching Two Uncalibrated Images Through the Recovery of the Unknown Epipolar Geometry", Artificial Intelligence Journal, vol. 78, 1995, pp. 87-110.

* cited by examiner

METHOD AND APPARATUS FOR USING ROTATIONAL MOVEMENT AMOUNT OF MOBILE DEVICE AND COMPUTER-READABLE RECORDING MEDIUM FOR STORING COMPUTER PROGRAM

BACKGROUND OF THE INVENTION

This application claims the priority of Korean Patent Application No. 2003-95522, filed on Dec. 23, 2003, in the Korean Intellectual Property Office, the disclosure of which is incorporated herein in its entirety by reference.

1. Field of the Invention

The present invention relates to a mobile device, and more particularly, to a method and apparatus for obtaining an amount of rotational movement of a mobile device and using the same, and a computer-readable recording medium for storing a computer program.

2. Description of the Related Art

In general, in order to automatically control a moving object (hereinafter referred to as mobile device), the posture of the mobile device should be obtained in real time. Posture means information on the position and pose of the mobile device. A conventional method in which the mobile device itself obtains the posture is largely classified into one of: a local tracking method and a global localization method. These methods are disclosed for instance on page 10 of a technical report entitled "Where am I? Sensors and Methods for Mobile Robot Positioning" written by J. Borenstein, H. R. Everett, and L. Feng, published on April 1996 and prepared by the University of Michigan for the Oak Ridge National Laboratories D & D Program.

According to the local tracking method of the disclosed methods, the posture can be simply recognized using an odometry. However, this method has a problem of being sensitive to a kinematic modeling error and a unstructured error. To solve the problem, a variety of types of error modeling and compensation methods have been developed and are disclosed for example on pages 132-150 of the above technical report, a thesis entitled "Measurement and Correction of Systematic Odometry Errors in Mobile Robots" (J. Borenstein, and L. Feng, IEEE Transactions on Robotics and Automation, Vol. 12, No. 6, December 1996, pp. 869-880), and a thesis entitled "Relative Localization using Path Odometry Information" (Nakju Lett Doh, Howie Choset, and Wan Kyun Chung, submitted to IEEE Transactions on Robotics and Automation). These error modeling and compensation methods are limited to being applied only when the structured errors can be mathematically expressed.

Thus, the position of the mobile device is estimated using a linear accelerometer while the pose of the mobile device is estimated using a gyro or compass. In this case, conventional filter design methods to stably estimate the posture from a sensed signal exist. However, the conventional method of estimating the posture by integrating the sensed result has problems of not only considerably degrading accuracy in recognizing posture as time passes due to accumulated integral errors, and but also using expensive sensors.

To solve the above problems, there is a conventional method of estimating a relative movement of a mobile device using flow of a camera image every hour by utilizing a vision system. However, although this method is processed by a simple system structure, a calculation time to process the image flow is prolonged.

SUMMARY OF THE INVENTION

To solve the above and/or other problems, the present invention provides a method of using an amount of rotational movement of a mobile device by estimating a rotational movement amount from a linear movement amount obtained from the result of sensing linear movement of the mobile device and using the estimated rotational movement amount.

The present invention provides an apparatus for using an amount of rotational movement of a mobile device by estimating a rotational movement amount from a linear movement amount obtained from the result of sensing linear movement of the mobile device and using the estimated rotational movement amount.

The present invention provides a computer-readable recording medium for storing a computer program which controls an apparatus for using an amount of rotational movement of a mobile device.

According to an aspect of the present invention, a method of using a rotational movement amount of a mobile device comprising obtaining images at two different points on a path along which the mobile device moves, searching for matching points with respect to the obtained images and obtaining an image coordinate value of each of the matching points, sensing linear movement of the mobile device and obtaining a linear movement amount using a result of sensing, and obtaining the rotational movement amount using the image coordinate values and the linear movement amount.

According to another aspect of the present invention, an apparatus for using a rotational movement amount of a mobile device comprising an image obtaining portion which obtains images from two different points on a path along which the mobile device moves, a coordinate value generating portion which searches for matching points with respect to the obtained images and generates an image coordinate value for each of the matching points, a sensing portion which senses linear movement of the mobile device, and a movement amount generating portion which generates a linear movement amount from a result of sensing and generates the rotational movement amount from the image coordinate values and the linear movement amount.

According to yet another aspect of the present invention, a computer-readable recording medium for storing at least one computer program to control an apparatus for using a rotational movement amount of a mobile device, the computer program comprises obtaining images at two different points on a path along which the mobile device moves, searching for matching points with respect to the obtained images and generating an image coordinate value of each of the matching points, sensing linear movement of the mobile device and generating a linear movement amount using a result of sensing, and generating the rotational movement amount using the image coordinate values and the linear movement amount.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
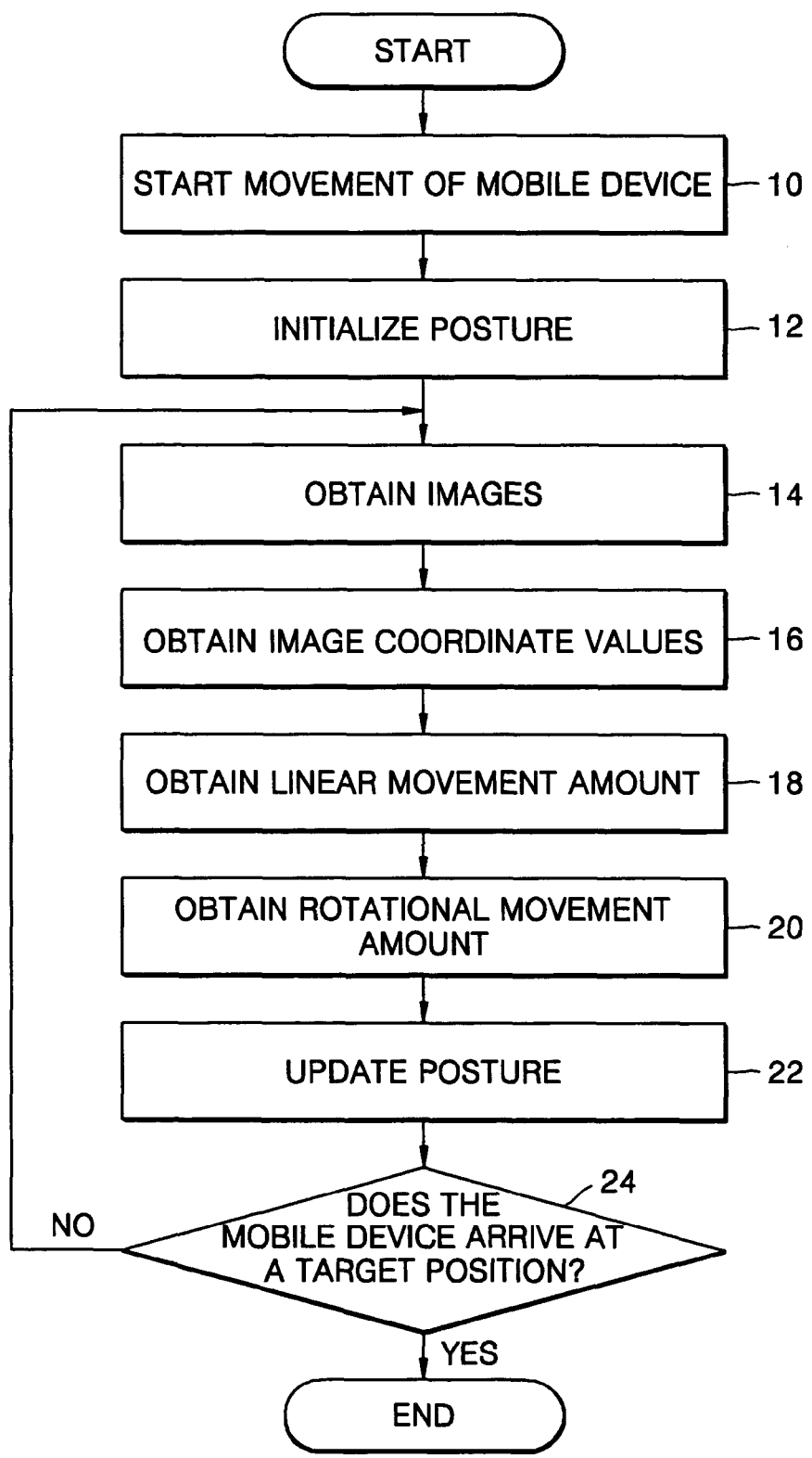
FIG. 1 is a flow chart for explaining a method of using a rotational movement amount of a mobile device according to an embodiment of the present invention.

Referring to the flow chart of FIG. 1, a method of using a rotational movement amount of a mobile device according to an embodiment of the present invention includes the steps of initializing a mobile device (Steps 10 and 12), obtaining amounts of a linear movement and a rotational movement of the mobile device (Steps 14, 16, 18, and 20), updating posture (Step 22), and determining whether the mobile device arrives at a target position (Step 24).

In detail, a mobile device starts to move (Step 10). The mobile device may be devices moving in 3-D or 2-D, for example, a mobile robot, an Artificial Intelligent automobile, or a unmanned air vehicle.

After Step 10, posture of the mobile device is initialized (Step 12). The posture of the mobile device means information on the position and pose of the mobile device. The initialization of the posture signifies setting the information on the position and pose of the mobile device to, for example, "0" and a movement start point to the origin. After Step 12, two images are obtained from the first and second points which are different from each other on a path along which the mobile device moves (Step 14).

After Step 14, matching points between the obtained two images are searched for and an image coordinate value is obtained and stored with respect to each of the matching points (Step 16). The matching points may be the minimum required matching points. The number of the minimum required matching points may be 8 or 2. Also, according to the present invention, to extract an accurate image coordinate in spite of an error generated during the extraction of the image coordinate, an error due to image noise, and an error due to parameters of a camera (not shown) which obtains an image, the number of the matching points can be set as the number of the minimum required matching points, that is, an integral multiple of 8 or 2.

After Step 16, a linear movement of the mobile device is sensed and the amount of the linear movement is obtained using the result of sensing (Step 18). The linear movement amount can be obtained in various forms according to the mechanical characteristic of the mobile device, for example, whether a wheel mechanism of the mobile device moving using wheels is adopted or whether the mobile device is an air vehicle. The various forms of obtaining the linear movement amount can be realized by using the techniques disclosed in a book entitled "Sensors for Mobile Robots—Theory and Application" (H. R. Everette, A K Peters, Ltd., 1995 pp. 35-65) for example, herein incorporated by reference.

According to an aspect of the present invention, the linear movement amount can be obtained directly from the result of sensing of the linear movement of the mobile device. For example, the acceleration of the mobile.device is sensed using an acceleration sensor and the sensed acceleration is integrated twice to obtain the linear movement amount of the mobile device.

According to another aspect of the present invention, the linear movement amount can be obtained indirectly from the result of sensing of the linear movement of the mobile device. For example, the linear movement velocity at the center of the mobile device is obtained from the rotational velocity of a wheel of the mobile device and the linear movement velocity is integrated to calculate the linear movement amount of the mobile device.

After Step 18, a rotational movement amount is obtained using the stored image coordinate values and the linear movement amount (Step 20). According to the present invention, the rotational movement amount of the mobile device can be obtained using a conversion matrix ($R_{1,2}$) by the rotational movement amount obtained from Equation 1.The conversion matrix refers to a matrix to convert a vector component expressed as Coord. 1 to a vector component expressed as Coord. 2.

$$\left[\frac{\overline{u_{i,1}}}{f_{sx}} a_i \frac{\overline{v_{i,1}}}{f_{sy}}\right] \cdot R_{2,1} \cdot \left[\frac{u_{i,2}}{f_{sx}} 1 \frac{v_{i,2}}{f_{sy}}\right]^T = 0 \quad \text{[Equation 1]}$$

Here, i=1, . . . , I, I denotes the number of the minimum required matching points, $u_{i,2}$ and $v_{i,2}$ denote the image coordinate values obtained in Step 16. $R_2$, 1 is an inverse matrix of $R_{1,2}$ and denotes a normalized matrix.

$$f_{sx} = \frac{f_1}{s_x} \text{ and } f_{sy} = \frac{f_2}{s_y}.$$

$f_1$ and $f_2$ denote focal distances from the two points where the two images are obtained. $s_x$ and $s_y$ denote scale factors. T denotes a transposed matrix and $a_1$ denotes a constant. The normalized matrix refers to a matrix in which a scale is adjusted such that the size of each column vector of the matrix is 1.The $$\left[\frac{\overline{u_{i,1}}}{f_{sx}} a_i \frac{\overline{v_{i,1}}}{f_{sy}}\right]$$

of Equation 1 can be expressed as shown in Equation 2.

$$\left[\frac{\overline{u_{i,1}}}{f_{sx}} a_i \frac{\overline{v_{i,1}}}{f_{sy}}\right] = \left[\frac{u_{i,1}}{f_{sx}} 1 \frac{v_{i,1}}{f_{sy}}\right] s(^1 t_{1,2}) \quad \text{[Equation 2]}$$

Here, $t_{1,2}$ denotes a linear movement amount and $^1t_{1,2}$ denotes a linear movement amount expressed as Coord. 1. $u_{i,1}$ and $v_{i,1}$ denote the image coordinate values obtained in Step 16. s( ) denotes a skew-symmetric matrix defined to express the cross product calculation of a vector. The process of obtaining $s(^1t_{1,2})$ from $^1t_{1,2}$ is disclosed in a book entitled "Image Processing, Analysis and Machine Vision"p9 (Sonka, V. Hlavac and R. Boyle, PWS Publishing, 1999, p. 462), herein incorporated by reference.

The process of extracting a rotational movement amount from the normalized matrix ($R_{2,1}$) is disclosed in a book entitled "Introduction to Robotics" (John J. Craig, Addison-Wesley Publishing Company, 1986, p. 50), herein incorporated by reference.

The process of obtaining Equation 1 is described below with reference to the accompanying drawings.

Figure 2:
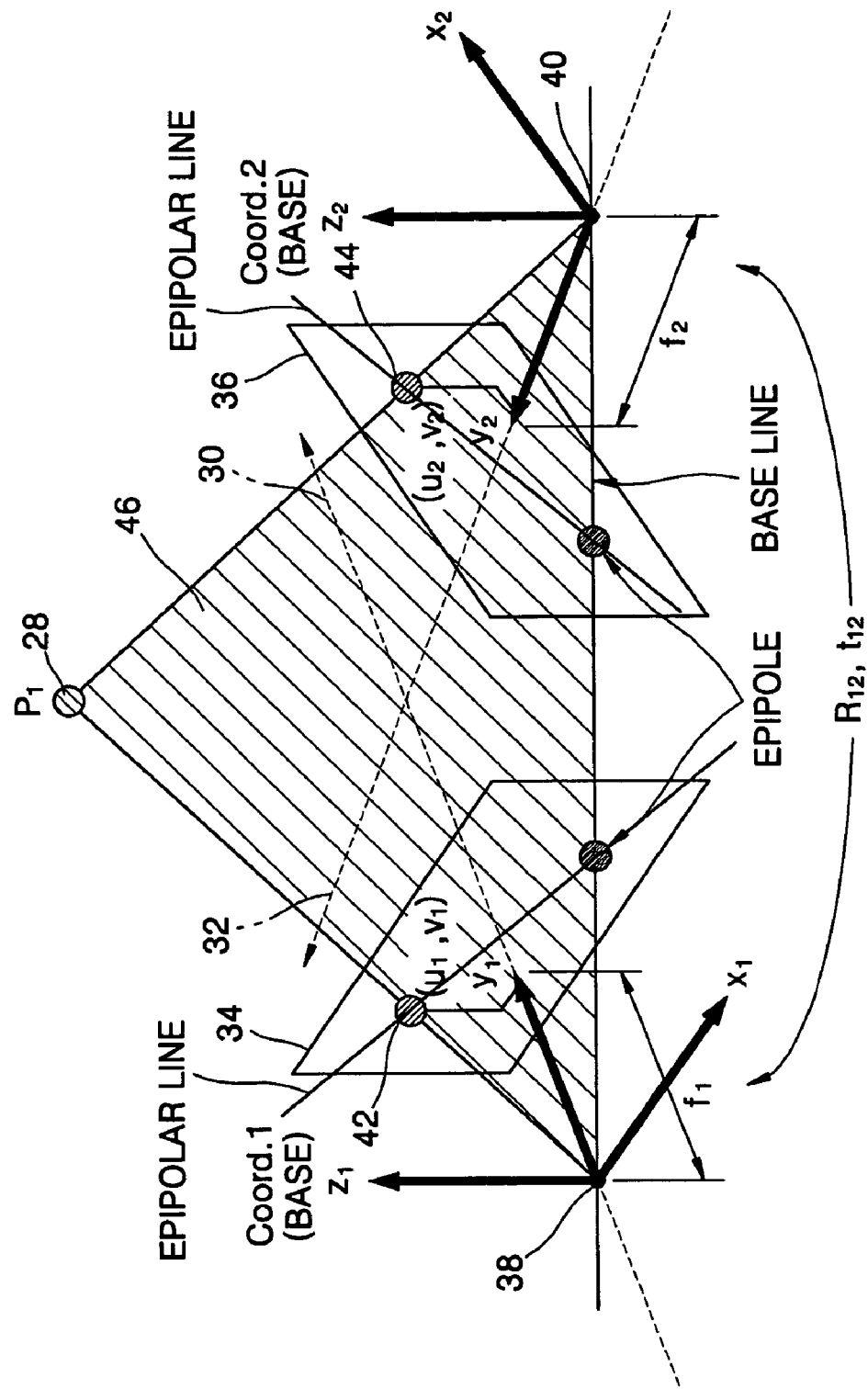
FIG. 2 is a view for explaining the principle of Epipolar Geometry.

FIG. 2 is a view for explaining the principle of Epipolar Geometry. Referring to FIG. 2, Equation 1 is based on the Epipolar Geometry disclosed in a book entitled "Image Processing, Analysis and Machine Vision" (Sonka, V. Hlavac and R. Boyle, PWS Publishing, 1999, pp. 448-465), incorporated herein by reference. A focal point of a camera (not shown) photographing an object 28 in a space is disposed at a point 38 and an optical axis is set along a direction 30. When the object 28 is photographed in this state, the object 28 is projected on an image plane 34. An image coordinate $(u_1, v_1)$ of an object 42 projected on the image plane 34 and a coordinate $[^1P_1=(X_1, Y_1, Z_1)]$ of the object 28 in the space have a relationship as expressed in Equation 3. Here, $^iP_j$, wherein i=1 or i=2, denotes a coordinate of a point $P_j$ in view of an i coordinate system.

$$u_1 = \frac{f_{sx}}{Y_1} \cdot X_1 \quad \text{[Equation 3]}$$
$$v_1 = \frac{f_{sy}}{Y_1} \cdot Z_1$$

Here, the unit of each of $u_1$ and $v_1$ is the number of pixels.

Likewise, the focal point of a camera photographing the object 28 in a space is disposed at another point 40 and an optical axis is set along a direction 32. When the object 28 is photographed in this state, the object 28 is projected on another image plane 36. An image coordinate $(u_2, v_2)$ of an object 44 projected on the image plane 36 and a coordinate $[^2P_1=(X_2, Y_2, Z_2)]$ of the object 28 in the space have a relationship as expressed in Equation 4.

$$u_2 = \frac{f_{sx}}{Y_2} \cdot X_2 \quad \text{[Equation 4]}$$
$$v_2 = \frac{f_{sy}}{Y_2} \cdot Z_2$$

Here, the unit of each of $u_2$ and $v_2$ is the number of pixels.

A conversion relationship between the coordinate systems ($^1P_1$ and $^2P_1$) with respect to the same object is expressed in Equation 5.

$$^1P_1 = R_{2,1} \cdot {}^2P_1 + {}^1t_{1,2} \quad \text{[Equation 5]}$$

Equation 5 can be expressed into Equation 6.

$$\left[\frac{Y_1}{f_{sx}} \cdot u_1 \quad Y_1 \quad \frac{Y_1}{f_{sy}} \cdot v_1\right]^T = R_{2,1} \cdot \left[\frac{Y_2}{f_{sx}} \cdot u_2 \quad Y_2 \quad \frac{Y_2}{f_{sy}} \cdot v_2\right]^T + {}^1t_{1,2} \quad \text{[Equation 6]}$$

In general, a matter of ego-motion estimation using the Epipolar Geometry refers to estimation of the linear movement amount $(t_{1,2})$ and the matrix $(R_{2,1})$ using the image coordinate values. Thus, constraints need to be used to remove a term for a coordinate value of the point $P_j$ in the space from Equation 6. The constraints are that the object $P_j$ in the space in FIG. 2, Epipoles, and the projected objects 42 and 44 all must be present on an Epipolar plane 46 corresponding to a shaded portion in FIG. 2. This can be expressed by Equation 7.

$$^1P_1 \bullet [{}^1t_{1,2} \times (R_{2,1} \cdot {}^2P_1)] = 0 \quad (\bullet: \text{inner product}) \quad \text{[Equation 7]}$$

$$^1P_1^T \cdot [s({}^1t_{1,2}) \times (R_{2,1} \cdot {}^2P_1)] = 0$$

$$Y_1 Y_2 \left[\frac{u_1}{f_{sx}} \quad 1 \quad \frac{v_1}{f_{sy}}\right] \cdot s({}^1t_{1,2}) R_{2,1} \cdot \left[\frac{u_2}{f_{sx}} \quad 1 \quad \frac{v_2}{f_{sy}}\right]^T = 0$$

$$\left[\frac{u_1}{f_{sx}} \quad 1 \quad \frac{v_1}{f_{sy}}\right] \cdot Q \cdot \left[\frac{u_2}{f_{sx}} \quad 1 \quad \frac{v_2}{f_{sy}}\right]^T = 0$$

Q is a final matrix to be obtained. Since the matrix Q has a size of 3×3, the number of equations to determine a normalized matrix satisfying Equation 7 is 8. This means that 8 or more matching points must be present in the space to calculate the matrix Q in this embodiment. The respective components of the matrix Q are obtained from equations to determine a normalized matrix satisfying Equation 7. This is disclosed in the book "Image Processing, Analysis and Machine Vision" (Sonka, V. Hlavac and R. Boyle, PWS Publishing, 1999, pp. 466-476), for example and herein incorporated by reference.

An algorithm of searching for matching points on two image planes with respect to a point in a space is disclosed in a book entitled "A Robust Technique for Matching Two Uncalibrated Images through the Recovery of the Unknown Epipolar Geometry" (Z. Zhang, R. Deriche, O. Faugeras, Q.-T. Luong, Artificial Intelligence Journal Vol. 78, 1995, pp. 87-110), for example, herein incorporated by reference.

Thus, when the linear movement amount of the mobile device obtained from Step 18 is substituted in Equation 7, the result thereof is expressed in Equation 8. A component of a vector $({}^1t_{1,2})$ can be calculated in advance through the linear movement amount $(t_{1,2})$ obtained from Step 18.

$$\left[\overline{\frac{u_{1,1}}{f_{sx}}} \quad a_i \quad \overline{\frac{v_{1,1}}{f_{sy}}}\right] \cdot R_{2,1} \cdot \left[\frac{u_{1,2}}{f_{sx}} \quad 1 \quad \frac{v_{1,2}}{f_{sy}}\right]^T = 0 \quad \text{[Equation 8]}$$

Here, since the matrix $(R_{2,1})$ determined by three components (Roll, Pitch, and Yaw) of the rotational movement amount of the mobile device in the space has a size of 3×3, the matrix is obtained form 8 minimum required matching points. Equation 8 is a case in which i=1, which can be generally expressed in Equation 1.

When the mobile device is limited to move in a 2-D plane, the rotational movement amount of the mobile device is determined only by considering a rotational component (Yaw) in a vertical direction with respect to the movement plane. Thus, in this case, the number of the minimum required matching points to obtain the normalized matrix $(R_{2,1})$ can be reduced to 2.

After Step 20, the posture of the mobile device is updated using the linear movement amount and the rotational movement amount (Step 22). That is, the posture of the mobile device obtained previously, that is, information on the position Trs' and pose Rot' of the mobile device, is updated to a new posture of the mobile device, that is, information on the position Trs and pose Rot of the mobile device, as shown in Equation 9.

$$Trs = Trs' + \Delta Trs$$

$$Rot = Rot' + \Delta Rot \quad \text{[Equation 9]}$$

Here, ΔTrs denotes a linear movement amount ($t_{1,2}$) obtained from Step 18 and ΔRot denotes the rotational movement amount obtained form Step 20.

After Step 22, whether the mobile device arrives at a target position is checked (Step 24). If the mobile device does not arrive at the target position, the process goes back to Step 14. However, if the mobile device arrives at the target position, the method of using a rotational movement amount of a mobile device shown in FIG. 1 is terminated.

According to the present invention, the method of using a rotational movement amount of a mobile device shown in FIG. 1 may selectively include Steps 10, 12, 22, and 24. That is, the method shown in FIG. 1 may include merely Steps 14, 16, 18, and 20, but not Steps 10, 12, 22, and 24. Alternatively, the method shown in FIG. 1 may include merely Steps 14, 16, 18, 20, and 22, but not Steps 10, 12, and 24.

In the method shown in FIG. 1, a finally updated posture can be obtained by repeatedly executing Step 14 through 22 until the mobile device arrives the target position. The posture of the mobile device can be recognized through the finally updated posture.

When the time to execute Step 16 of FIG. 1 is prolonged, the mobile device needs to stop or slowly move. Thus, there is a need to correct an error of the posture of the mobile device. A method of using a rotational movement amount of a mobile device according to another embodiment of the present invention to satisfy the above need is described with reference to the accompanying drawings.

Figure 3:
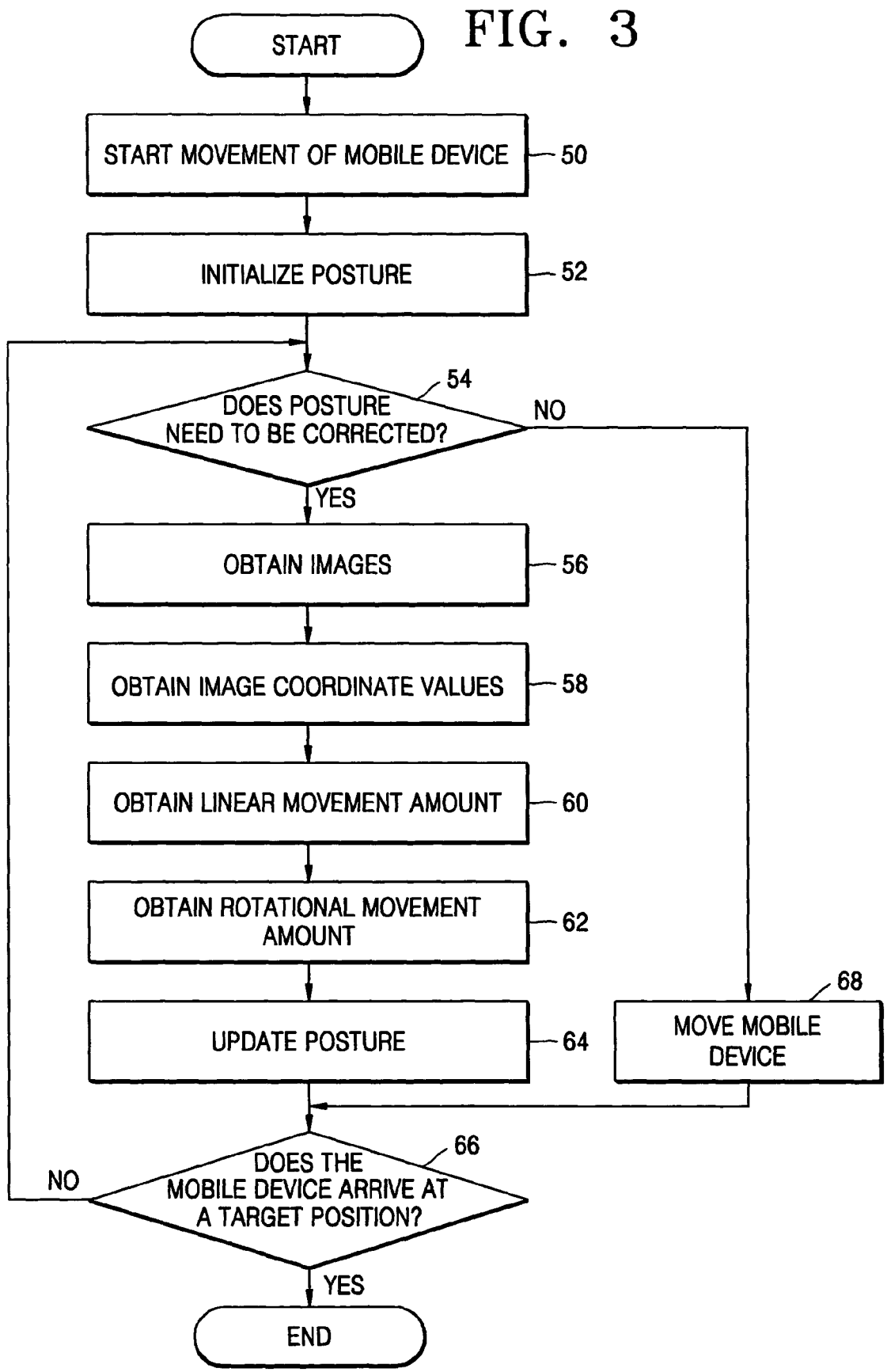
FIG. 3 is a flow chart for explaining a method of using a rotational movement amount of a mobile device according to another embodiment of the present invention.

FIG. 3 is a flow chart for explaining a method of using a rotational movement amount of a mobile device according to another embodiment of the present invention. The method includes the steps of initializing a mobile device (Steps 50 and 52), correcting (Steps 54, 56, 58, 60, 62, and 64), that is, updating, posture when the posture needs to be corrected, moving the mobile device when the posture does not need to be corrected (Step 68), and determining whether the mobile device arrives at a target position (Step 66).

Since the functions of Steps 50 and 52 of FIG. 3 are the same as those of Steps 10 and 12 of FIG. 1 and the functions of Steps 56-66 of FIG. 3 are the same as those of Step 14-24 of FIG. 1, detailed descriptions on these steps are omitted. Accordingly, the method shown in FIG. 3 further includes Steps 54 and 68 compared to the method shown in FIG. 1.

In the present embodiment, after Step 52 or if it is determined that the mobile device does not arrive at a target position, whether the posture of the mobile device is to be corrected is determined (Step 54). For this, for example, whether a time for which the mobile device moves lapses a predetermined time can be determined. The predetermined time can be set by a user as a time period to correct posture.

If it is determined that the posture of the mobile device is to be corrected, the process goes to Step 56. If it is determined that the posture of the mobile device does not need to be corrected, the mobile device is moved and the process goes to Step 66 (Step 68).

While in the method shown in FIG. 1 the mobile device may move during Steps 16-22, preferably in the method shown in FIG. 3 the mobile device should remain stopped during Steps 58-64. This is because it is preferred that the mobile device is moved by reflecting accurately corrected posture. In addition, in the method shown in FIG. 1, a path formed two points may be a curve or straight line. However, in the method shown in FIG. 3, the path formed by two points may be a straight line.

The structure and operation of an apparatus for using a rotational movement amount of a mobile device according to an embodiment of the present invention are described below with reference to the accompanying drawings.

Figure 4:
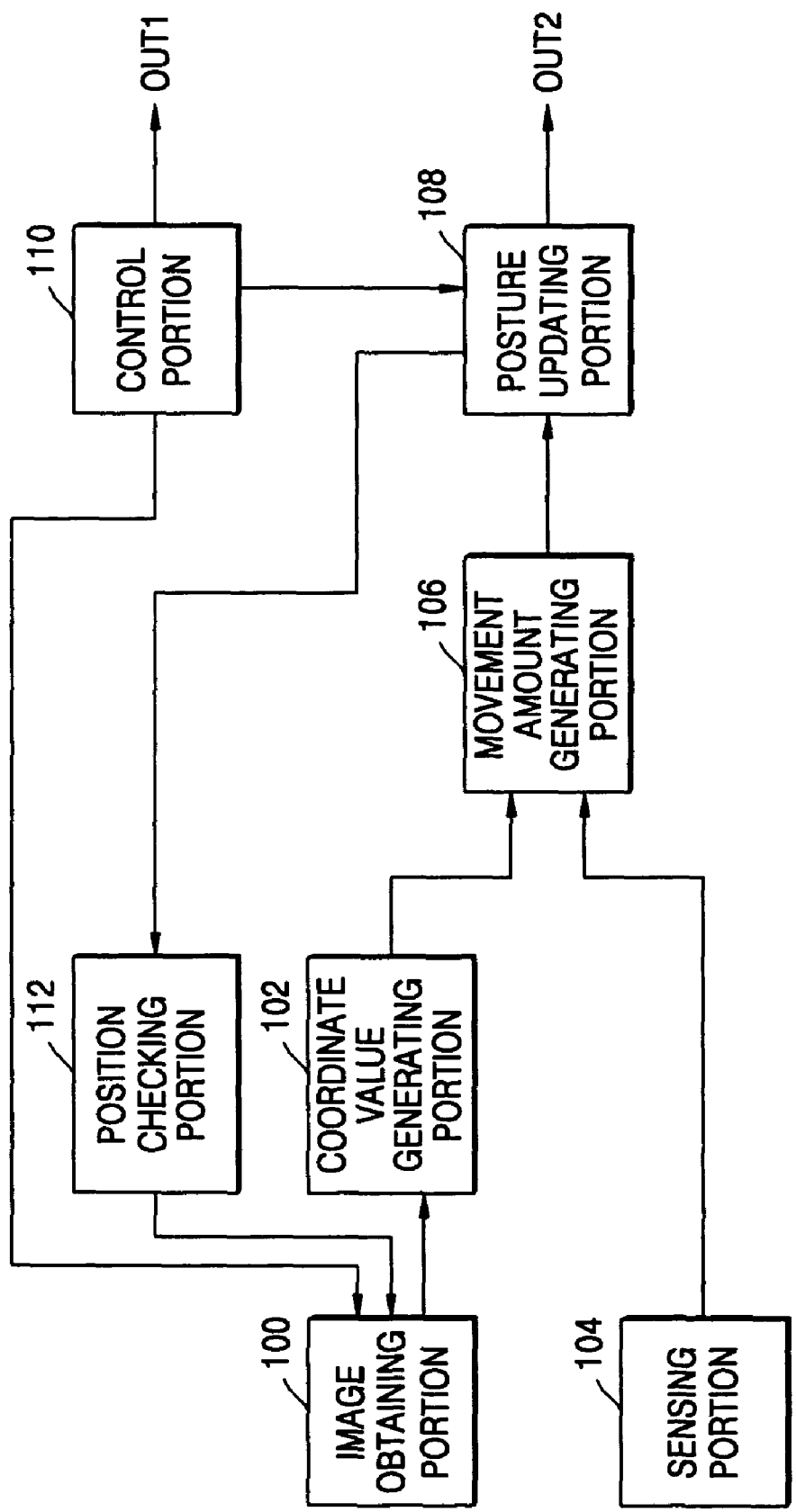
FIG. 4 is a block diagram illustrating an apparatus for using a rotational movement amount of a mobile device according to an embodiment of the present invention.

FIG. 4 is a block diagram illustrating an apparatus for using a rotational movement amount of a mobile device according to an embodiment of the present invention. Referring to FIG. 4, the apparatus includes an image obtaining portion 100, a coordinate value generating portion 102, a sensing portion 104, a movement amount generating portion 106, a posture updating portion 108, a control portion 110, and a position checking portion 112. An apparatus plays the role of performing the method shown in FIG. 1.

To execute Step 10 of FIG. 1, the control portion 110 generates a movement control signal and the generated movement control signal is output through an output port OUT1. Thus, the mobile device starts to move in response to the movement control signal.

The control portion 110 and the posture updating portion 108 perform Step 12. That is, the control portion 110 generates a posture initialization signal and the generated posture initialization signal is output through the posture updating portion 108. The posture updating portion 108 initializes the posture, that is, information on the position and pose of the mobile device, in response to the posture initialization signal output from the control portion 110.

To execute Step 14, in response to an obtainment control signal generated by and output from the control portion 110, the image obtaining portion 100 obtains images at two different points on a path along which the mobile device moves and outputs the obtained images to the coordinate value generating portion 102. For example, when the initialization of the mobile device is recognized to be completed through the obtainment control signal, the image obtaining portion 100 obtains the two images. To this end, the image obtaining portion 100 may be at least one camera (not shown) attached to the mobile device. While moving with the mobile device, the camera obtains two images from two different points.

To execute Step 16, the coordinate value generating portion 102 searches for matching points with respect to the obtained images, generates an image coordinate value of each matching point, and outputs the generated image coordinate value to the movement amount generating portion 106. The matching points found by the coordinate value generating portion 102 may correspond to the minimum required matching points.

The sensing portion 104 and the movement amount generating portion 106 perform Step 18. The sensing portion 104 senses linear movement of the mobile device and outputs the sensed result to the movement amount generating portion 106. For example, when the mobile device adopts a wheel mechanism moving using wheels, the sensing portion 104 may be a wheel encoder (not shown). However, when the mobile device is a flying object, the sensing portion 104 may be a linear accelerometer (not shown). The movement amount generating portion 106 generates a linear movement amount from the result sensed by the sensing portion. 104 and outputs the generated linear movement amount to the posture updating portion 108.

To execute Step 20, the movement amount generating portion 106 generates a rotational movement amount from the generated linear movement amount and the image coordinate values output from the coordinate value generating portion 102, and outputs the generated rotational movement amount to the posture updating portion 108.

To execute Step 22, the posture updating portion 108 updates the posture of the mobile device from the rotational movement amount and the linear movement amount generated by the movement amount generating portion 106, and outputs the updated result through an output port OUT2.

To execute Step 24, the position checking portion 112, in response to an update completion signal, checks whether the mobile device arrives at the target position and outputs the checked result to the image obtaining portion 100. That is, when the completion of the update of the posture is recognized through the update completion signal output from the posture updating portion 108, the position checking portion 112 checks whether the mobile device arrives at the target position.

The image obtaining portion 100 obtains an image in response to the result checked by the position checking portion 112 (Step 14). That is, when it is recognized from the result of checking output from the position checking portion 112 that the mobile device does not arrive at the target position, two images at different two points on the path along which the mobile device moves are obtained.

Like the method shown in FIG. 1 which selectively adopts Steps 10, 12, 22, and 24, the apparatus shown in FIG. 3 may selectively adopt the posture updating portion 108 and the position checking portion 112 and restrict the operation of the control portion 110 to selectively execute Steps 10 and 12.

Figure 5:
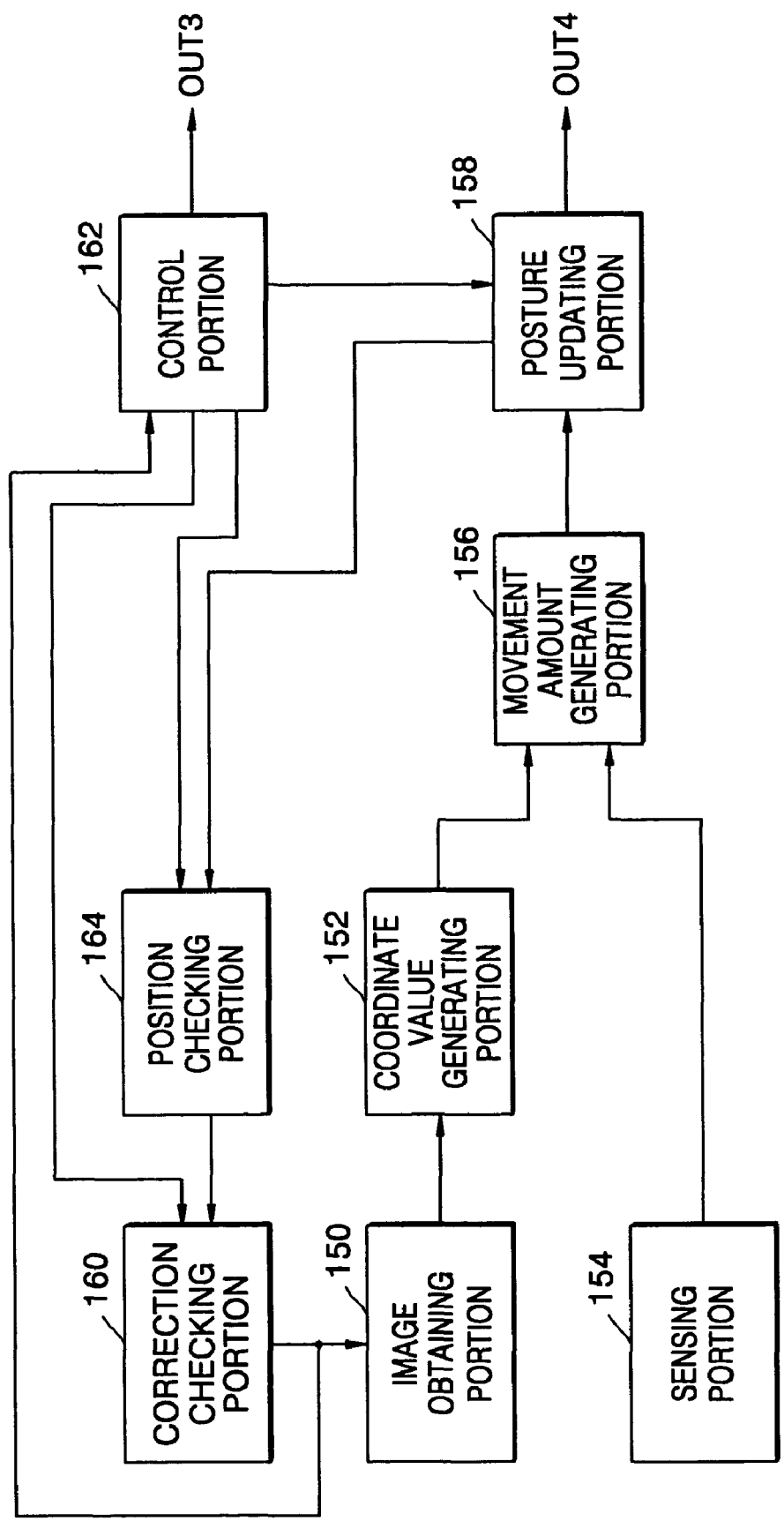
FIG. 5 is a block diagram illustrating an apparatus for using a rotational movement amount of a mobile device according to another embodiment of the present invention.

FIG. 5 is a block diagram illustrating an apparatus for using a rotational movement amount of a mobile device according to another embodiment of the present invention. The apparatus shown in FIG. 5 includes an image obtaining portion 150, a coordinate value generating portion 152, a sensing portion 154, a movement amount generating portion 156, a posture updating portion 158, a correction checking portion 160, a control portion 162, and a position checking portion 164.

The apparatus shown in FIG. 5 performs the method shown in FIG. 3. Since the coordinate value generating portion 152, the sensing portion 154, the movement amount generating portion 156, and the posture updating portion 158 shown in FIG. 5 have the same functions as those of the coordinate value generating portion 102, the sensing portion 104, the movement amount generating portion 106, and the posture updating portion 108 shown in FIG. 4, detailed descriptions thereof will be omitted.

To execute Step 50, the control portion 162 generates a movement control signal and outputs the generated movement control signal through an output port OUT3. Thus, the mobile device starts to move in response to the movement control signal.

The control portion 162 and the posture updating portion 158 execute Step 52. First, the control portion 162 generates a posture initialization signal and outputs the generated posture initialization signal to the posture updating portion 158. The posture updating portion 158 initializes posture in response to the posture initialization signal.

To execute Step 54, in response to a correction control signal generated by the control portion 162, the correction checking portion 160 checks whether to correct the posture of the mobile device and outputs the result of checking to the image obtaining portion 150 and the control portion 162. For example, when the completion of the initialization of the mobile device is recognized through the correction control signal, the correction checking portion 160 starts to check whether to correct the posture of the mobile device.

To execute Step 56, the image obtaining portion 150, in response to the result of checking an output from the correction checking portion 160, obtains images and outputs the obtained images to the coordinate value generating portion 152. That is, when it is recognized from the result of checking output from the correction checking portion 160 that the posture needs to be corrected, the image obtaining portion 150 obtains two images.

To execute Step 66, the position checking portion 164, in response to an update completion signal output from the posture updating portion 158, checks whether the mobile device arrives at the target position and outputs the result of checking to the correction checking portion 160. That is, if the it is recognized from the update completion signal that the updating of the posture is completed, the position checking portion 164 checks whether the mobile device arrives the target position.

To execute Step 54, the correction checking portion 160, in response to the result of checking by the position checking portion 164, checks whether the posture is corrected. That is, if it is recognized from the result of checking by the position checking portion 164 that the mobile device does not arrived at the target position, the correction checking portion 160 checks whether to correct the posture.

To execute Step 68, the control portion 162 generates a movement control signal in response to the result of checking by the correction checking portion 160. That is, if it is recognized from the result of checking by the correction checking portion 160 that the posture does not need to be corrected, the control portion 162 generates the movement control signal to move the mobile device and outputs the movement control signal through the output port OUT3. After executing Step 68, the control portion 162 controls the position checking portion 164 so that the position checking portion 164 executes Step 66.

A computer-readable recording medium for storing at least one computer program to control the above-described apparatus for using a rotational movement amount is described below.

The computer program stored in a computer capable of reading a recording medium according to the present invention executes the steps of obtaining images at two different points on a path along which a mobile device moves, searching for matching points with respect to the obtained images and generating an image coordinate value of each matching point, generating a linear movement amount by sensing linear movement of the mobile device, and generating a rotational movement amount using the image coordinate values and the linear movement amount.

The computer program may further execute a step of updating posture of the mobile device using the linear movement amount and the rotational movement amount. Moreover, the computer program stored on the recording medium may further execute a step of determining whether to correct the posture of the mobile device. In this case, if it is determined that the posture of the mobile device needs to be corrected, the process goes to the step of obtaining the images. Otherwise, the mobile device is moved.

The method and apparatus for using a rotational movement amount of a mobile device and a computer-readable recording medium for storing a computer program according to the present invention can be applied to an self-running technology that is a core technology of a mobile robot, development of an environment recognition technology, an unmanned flying system, or an extremely cold or hot area expedition equipment.

As described above, the method and apparatus for using a rotational movement amount of a mobile device and a computer-readable recording medium for storing a computer program according to the present invention, through a chief structure consisting of the sensor 104 or 154 sensing the linear movement amount of the mobile device and the image obtaining portion 100 or 150 obtaining images, for example, a camera, estimate the rotational movement amount of the mobile device to locally recognize the posture. Unlike the conventional method in which an error is accumulated according to time by repeated integrations, an error in estimating the rotation movement amount is within a bounded range. In particular, when the mobile device moves on a plane, in obtaining a solution of the Epipolar Geometry, the number of the matching points to be searched for can be reduced by ¼ compared to the case of using only images of a camera so that a calculation time is reduced. Also, the present invention has an effect of high applicability in development of a self-running system in real time of a mobile device, for example, a robot.

What is claimed is:

1. A method of determining a rotational movement amount of a mobile device comprising:
   generating a posture initialization signal of the mobile device;
   determining whether a posture of the mobile device is required by using a correction checking device;
   obtaining images at two different points on a path along which the mobile device moves by using an image obtaining device in response to the correction checking unit when a correction of the posture of the mobile device is required;
   searching for matching points with respect to the obtained images and obtaining an image coordinate value of each of the matching points;
   sensing linear movement of the mobile device and obtaining a linear movement amount from a sensing device; and
   obtaining the rotational movement amount by calculating the image coordinate values together with the linear movement amount; and
   updating posture of the mobile device using the linear movement amount and the rotational movement amount by using a posture updating device;
   determining whether the mobile device arrived at a target position by using a position checking device and outputting a result to the correction checking device; and
   generating a movement control signal by using a control unit upon determining the correction of the posture of the mobile device is not required,
   wherein the calculating of the image coordinate values together with the linear movement amount includes multiplying the image coordinate values with a cross product calculation of the linear movement amount.

2. The method of claim 1, wherein the mobile device moves from a time at which the image coordinate value is obtained until the posture is updated.

3. The method of claim 1, wherein the mobile device stops from a time at which the image coordinate value is obtained until the posture is updated.

4. The method of claim 1, further comprising:
   starting movement of the mobile device.

5. The method of claim 1, further comprising moving the mobile device and proceeding to determining whether the mobile device arrives at the target position if it is determined that the posture of the mobile device does not need to be corrected.

6. The method of claim 1, wherein the number of matching points is eight and the number of minimum required matching points is eight.

7. The method of claim 6, wherein the number of matching points is set to be an integral multiple of the number of minimum required matching points.

8. The method of claim 1, wherein the number of matching points is two and the number of a minimum required matching points is two.

9. The method of claim 1, wherein path formed by the two points is a straight line.

10. The method of claim 1, wherein the rotational movement amount of the mobile device is obtained using a conversion matrix ($R_{1,2}$) that is obtained as follows, $$\left[\frac{\overline{u_{i,1}}}{f_{sx}} a_i \frac{\overline{v_{i,1}}}{f_{sy}}\right] \cdot R_{2,1} \cdot \left[\frac{u_{i,2}}{f_{sx}} 1 \frac{v_{i,2}}{f_{sy}}\right]^T = 0,$$

wherein $\left[\frac{\overline{u_{i,1}}}{f_{sx}} a_i \frac{\overline{v_{i,1}}}{f_{sy}}\right] = \left[\frac{u_{i,1}}{f_{sx}} 1 \frac{v_{i,1}}{f_{sy}}\right] s({}^1 t_{1,2})$ and i=1, ..., l, l denotes the number of the minimum required matching points, and ${}^1 t_{1,2}$ denotes a linear movement amount expressed as Coord. 1, $u_{i,2}$, $u_{i,1}$, $v_{i,1}$, and $v_{i,2}$ denote the image coordinate values, s( ) denotes a skew-symmetric matrix defined to express the cross product calculation of a vector, $R_{2,1}$ is an inverse matrix of $R_{1,2}$, $$f_{sx} = \frac{f_1}{s_x}, f_{sy} = \frac{f_2}{s_y},$$

$f_1$ and $f_2$ denote focal distances from the two points, $s_x$ and $s_y$ denote scale factors, T denotes a transposed matrix, and $a_1$ denotes a constant.

11. An apparatus for determining a rotational movement amount of a mobile device comprising:
   a correction checking portion which determines whether a correction of a posture of the mobile device is required;
   an image obtaining portion which obtains images from two different points on a path along which the mobile device moves, upon determining that the posture of the mobile device is required;
   a coordinate value generating portion which searches for matching points with respect to the obtained images and generates an image coordinate value for each of the matching points;
   a sensing portion which senses linear movement of the mobile device;
   a movement amount generating portion which generates a linear movement amount from a result of sensing and generates the rotational movement amount by calculating the image coordinate values together with the linear movement amount;
   a posture updating portion which updates posture of the mobile device from the linear movement amount and the rotational movement amount generated by the movement amount generating portion and outputs an updated result;
   a position checking portion which determines whether the mobile device arrived at a target position and outputting a result to the correction checking portion; and
   a control portion generating a movement control signal upon determining that the correction of the posture of the mobile device is not required, and generating a posture initialization signal,
   wherein the calculating of the image coordinate values together with the linear movement amount includes multiplying the image coordinate values with a cross product calculation of the linear movement amount.

12. The apparatus of claim 11, wherein the image obtaining portion obtains the images in response to a result of determining of the correction checking portion.

13. The apparatus of claim 12, wherein the control portion generates a correction control signal; and
the position checking portion checks whether the mobile device arrives at a target position in response to an update completion signal that indicates completion of update of the posture and is received from the posture updating portion,
wherein the mobile device moves in response to the movement control signal, the posture updating portion initializes the posture in response to the posture initialization signal, and the correction checking portion checks whether to correct the posture in response to the correction control signal or a result of checking checked by the position checking portion.

14. The apparatus of claim 13, wherein the control portion generates the movement control signal in response to a result of checking by the correction checking portion and controls a checking operation of the position checking portion.

15. The apparatus of claim 11, wherein
the control portion which generates an obtainment control signal; and
the position checking portion which checks whether the mobile device arrives at a target position in response to an update completion signal that indicates completion of update and is received from the posture updating portion,
wherein the mobile device moves in response to the movement control signal, the posture updating portion initializes the posture in response to the posture initialization signal, and the image obtaining portion obtains the image in response to the obtainment control signal and a result of checking by the position checking portion.

16. A non-transitory computer-readable storage medium storing at least one computer program to control at least one processing device to implement a method of determining a rotational movement amount of a mobile device, the method comprising:
determining whether a posture of the mobile device is required;
obtaining images at two different points on a path along which the mobile device moves, upon determining that the posture of the mobile device is required;
searching for matching points with respect to the obtained images and generating an image coordinate value of each of the matching points;
sensing linear movement of the mobile device and generating a linear movement amount from the sensing;
generating the rotational movement amount by calculating the image coordinate values together with the linear movement amount;
updating posture of the mobile device using the linear movement amount and the rotational movement amount,
determining whether the mobile device arrived at a target position and outputting a result; and
generating a movement control signal upon determining that the correction of the posture of the mobile device is not required,
wherein the calculating of the image coordinate values together with the linear movement amount includes multiplying the image coordinate values with a cross product calculation of the linear movement amount.

* * * * *